C. L. ARCHIE.
CHURN OPERATING MEANS.
APPLICATION FILED AUG. 7, 1908.
926,535.
Patented June 29, 1909.
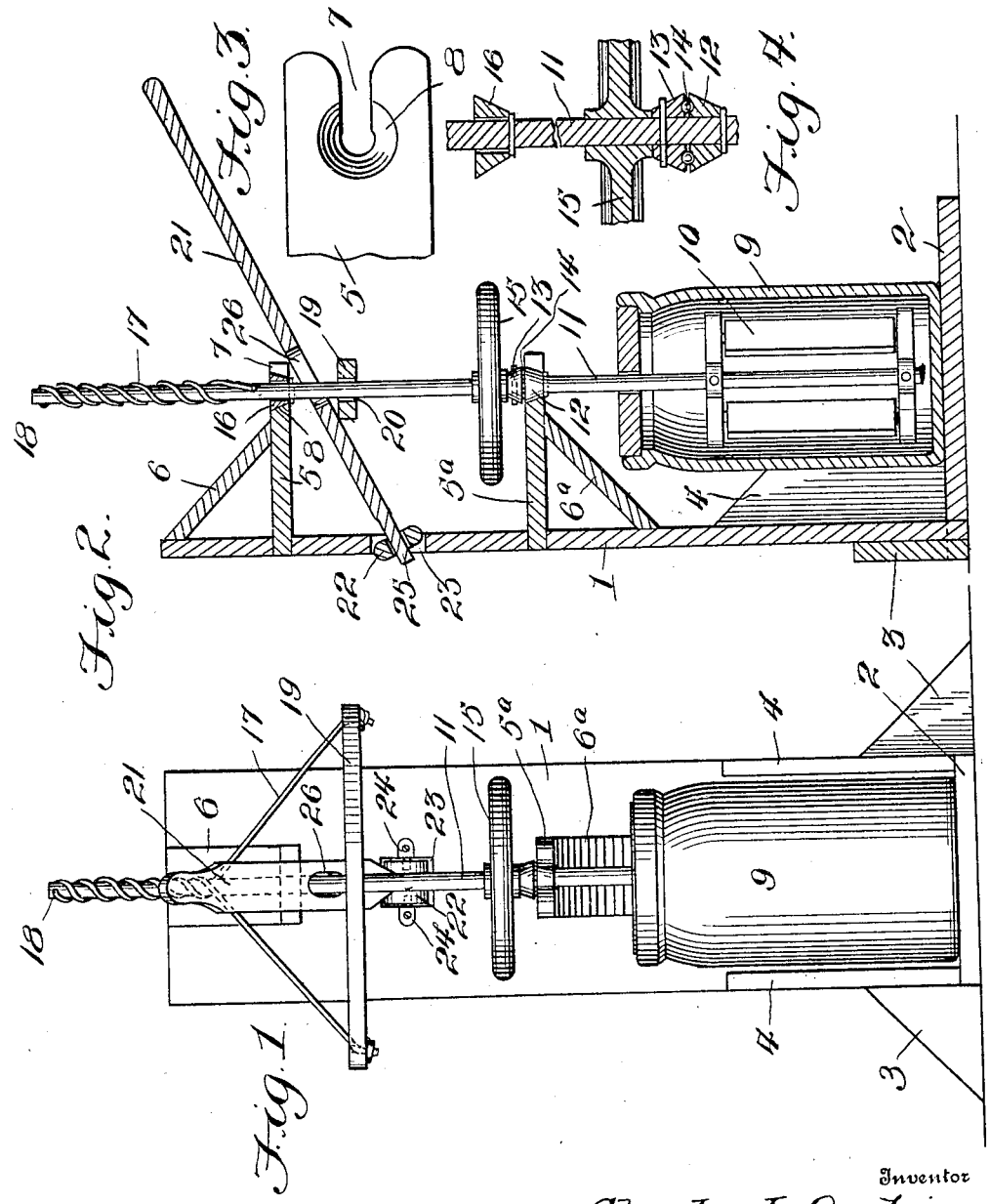
Inventor
Charles L. Archie,
Witnesses
By Victor J. Evans
Attorney

UNITED STATES PATENT OFFICE.

CHARLES L. ARCHIE, OF PATMOS, ARKANSAS.

CHURN-OPERATING MEANS.

No. 926,535.      Specification of Letters Patent.      Patented June 29, 1909.

Application filed August 7, 1908. Serial No. 447,435.

*To all whom it may concern:*

Be it known that I, CHARLES L. ARCHIE, a citizen of the United States of America, residing at Patmos, in the county of Hempstead and State of Arkansas, have invented new and useful Improvements in Churn-Operating Means, of which the following is a specification.

This invention relates to churn-operating devices, and one of the principal objects of the same is to provide a simple and efficient means to rotate a churn dasher in opposite directions intermittently.

Another object of the invention is to provide a churn-operating device comprising a lever which is reciprocable to give to the churn dasher intermittent rotary motion in opposite directions.

These and other objects may be attained by means of the construction illustrated in the accompanying drawing, in which,—

Figure 1 is a front elevation of a churn-operating device made in accordance with my invention. Fig. 2 is a central vertical section of the same. Fig. 3 is a detail plan view of the outer end of one of the supporting bars for the dasher rod. Fig. 4 is a detail sectional view taken through the dasher rod, the fly wheel and the ball bearing for said dasher rod.

Referring to the drawing, the numeral 1 designates an upright connected to a base 2, said base being provided with suitable braces 3 and forwardly extending triangular side pieces 4.

Connected to the upright 1 near the upper end is an outwardly extending supporting bar 5 to which a brace 6 is connected, said brace extending from said bar 5 to the upright 1. In the outer end of the bar 5 a slot 7 is formed, and at the inner end of said slot a countersunk opening 8 is formed. A supporting bar 5ª having a brace 6ª is located below the bar 5 and is provided at its outer end with a slot and countersunk opening similar to said bar 5.

The churn 9 is supported upon the base 2, and the dasher 10 is connected to the dasher rod 11 in any suitable manner. Connected to the rod 11 are the ball cones 12 and 13 provided with intermediate balls 14. Secured to the rod 11 is a fly wheel 15. The cone 12 is seated in the countersunk opening in the supporting bar 5ª. Connected to the dasher rod 11 is a frusto-conical bushing 16, and this bushing is designed to fit in the countersunk opening 8 in the supporting bar 5. A flexible cord or rope 17 is connected centrally, as at 18, to the outer end of the dasher rod 11, and the ends of said cord or rope are passed through the opposite ends of a twisting bar 19 provided with a central aperture 20 through which the dasher rod 11 extends.

The operating lever 21 is pivoted to the upright 1 by means of a suitable bearing comprising a spool 22 pivoted in an aperture 23 in the upright 1. Suitable trunnions 24 secured at the sides of the aperture 23 extend into the spool 22 to pivot the same in said aperture and to permit the required movements to the lever 21. The end 25 of the lever is reduced and slides freely in an opening through the spool 22. The lever 21 is provided with an enlarged opening 26 through which the dasher rod 11 extends, said lever being arranged above the twisting bar 19.

The operation of my invention may be briefly described as follows: To wind up the cord which raises the lever the balance wheel may be turned slightly by hand or the dasher rod may be turned to wind up the cord. The downward stroke of the lever turns the rod in one direction, and the balance wheel keeps up the motion in the same direction until the cord is rewound, and the lever is thereby raised ready for the next stroke which will reverse the motion of the rod and do so at each stroke.

My invention is of simple construction, may be readily applied to any rotary dasher churn, can be manufactured at slight cost and is efficient and desirable for its purpose.

I claim:—

The herein described churn operating mechanism comprising an upright frame, a dasher rod, ball bearings on said rod, a fly wheel connected to said rod, a supporting bar extending from the frame and provided with an open slot to receive the ball bearings of said dasher rod, a flexible cord connected to the upper end of said dasher rod, a twisting bar mounted to slide upon said rod, said cord being connected at its ends to the ends of said twisting bar, a lever for moving said
5 twisting bar to rotate said dasher rod, and a spool pivotally mounted in the upright frame, said lever extending through the spool.

In testimony whereof I affix my signature in presence of two witnesses.

CHARLES L. ARCHIE.

Witnesses:
W. A. FORMBY,
O. H. OWENS.